(12) United States Patent
Zhang (10) Patent No.: US 9,116,369 B2
(45) Date of Patent: Aug. 25, 2015

(54) LCD DEVICE AND A METHOD OF MANUFACTURING THE SAME

(75) Inventor: Xin Zhang, Guandong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 425 days.

(21) Appl. No.: 13/522,021

(22) PCT Filed: May 14, 2012

(86) PCT No.: PCT/CN2012/075447
§ 371 (c)(1),
(2), (4) Date: Jul. 13, 2012

(87) PCT Pub. No.: WO2013/159407
PCT Pub. Date: Oct. 31, 2013

(65) Prior Publication Data
US 2013/0286341 A1    Oct. 31, 2013

(51) Int. Cl.
G02F 1/1343 (2006.01)
G02F 1/1345 (2006.01)
G02F 1/136 (2006.01)
G02F 1/13 (2006.01)
G02F 1/1362 (2006.01)

(52) U.S. Cl.
CPC ........ *G02F 1/1309* (2013.01); *G02F 1/136286* (2013.01)

(58) Field of Classification Search
USPC .......................................... 445/24
See application file for complete search history.

(56) References Cited

U.S. PATENT DOCUMENTS

| 6,849,873 B2* | 2/2005 | Baek et al. ............ 257/72 |
| 2002/0008799 A1* | 1/2002 | Ota et al. ............ 349/43 |
| 2006/0043365 A1* | 3/2006 | Kwak ............ 257/59 |

* cited by examiner

*Primary Examiner* — Richard Kim
*Assistant Examiner* — Ryan Crockett
(74) *Attorney, Agent, or Firm* — Andrew C. Cheng (57) ABSTRACT

A liquid crystal display (LCD) device and a method of manufacturing the same are proposed. A first transparent conducting layer is disposed on a first via for forming a testing point. A second transparent conducting layer is disposed on a second via and a third via. The first transparent conducting layer is connected to the second transparent conducting layer. By means of the method of manufacturing, the first transparent conducting layer and the second transparent conducting layer are still connected to each other after a process of edge exposure. It ensures that the testing point could be connected to a first metallic wiring layer and a second metallic wiring layer, preventing the testing point from malfunctioning.

7 Claims, 7 Drawing Sheets

LCD DEVICE AND A METHOD OF MANUFACTURING THE SAME

BACKGROUND OF THE INVENTION

1. Field of the Invention

The present invention relates to the field of liquid crystal displays (LCDs), and more particularly, to an LCD device and a method of manufacturing the same.

2. Description of the Prior Art

Figure 1:
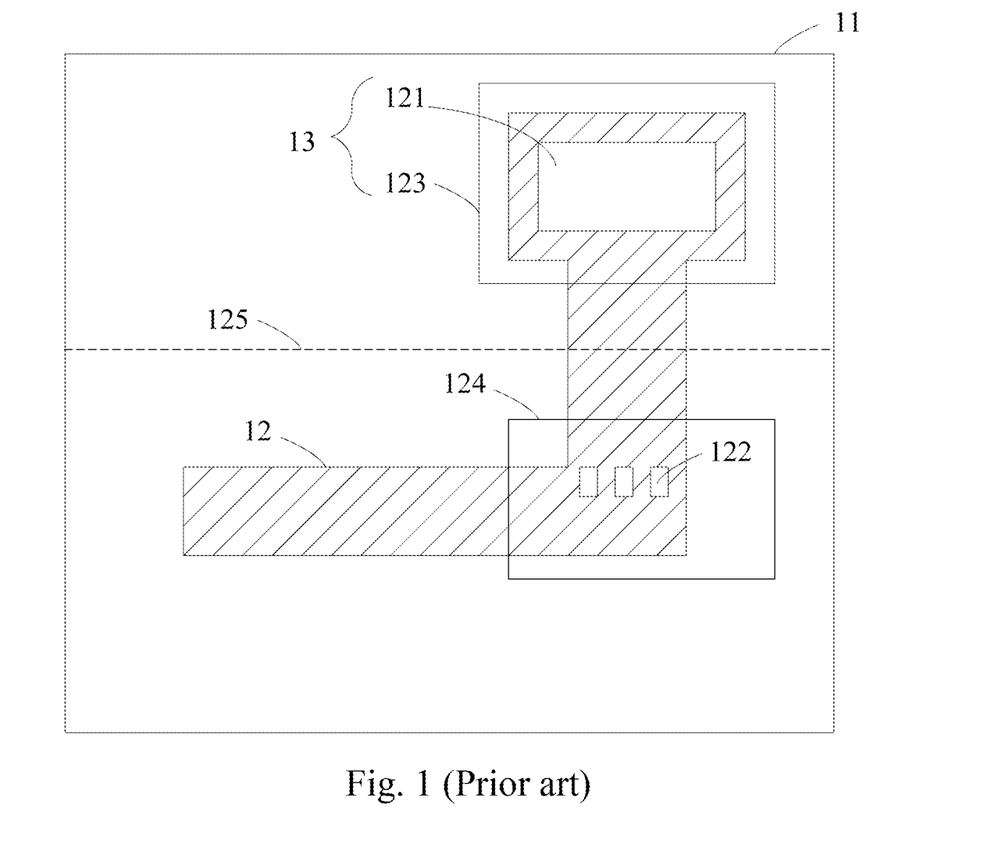
FIG. 1 is a structure diagram showing a conventional LCD device.

Referring to FIG. 1, a conventional LCD device comprises a substrate 11 and a metallic wiring layer 12 disposed on the substrate 11. A first via 121 and a second 122 are disposed on the metallic wiring layer 12. A first transparent conducting layer 123 is disposed on the first via 121 for forming a testing point 13. A second transparent conducting layer 124 is disposed on the second via 122. The first transparent conducting layer 123 and the second transparent conducting layer 124 are disposed respectively. The testing point 13 is connected to the metallic wiring layer 12 through the first via 121.

One process for manufacturing the LCD device is that the edge of the metallic wiring layer 12 is exposed. That is, metal along an exposed edge 125 and the edge of the substrate 11 is washed out.

Figure 2:
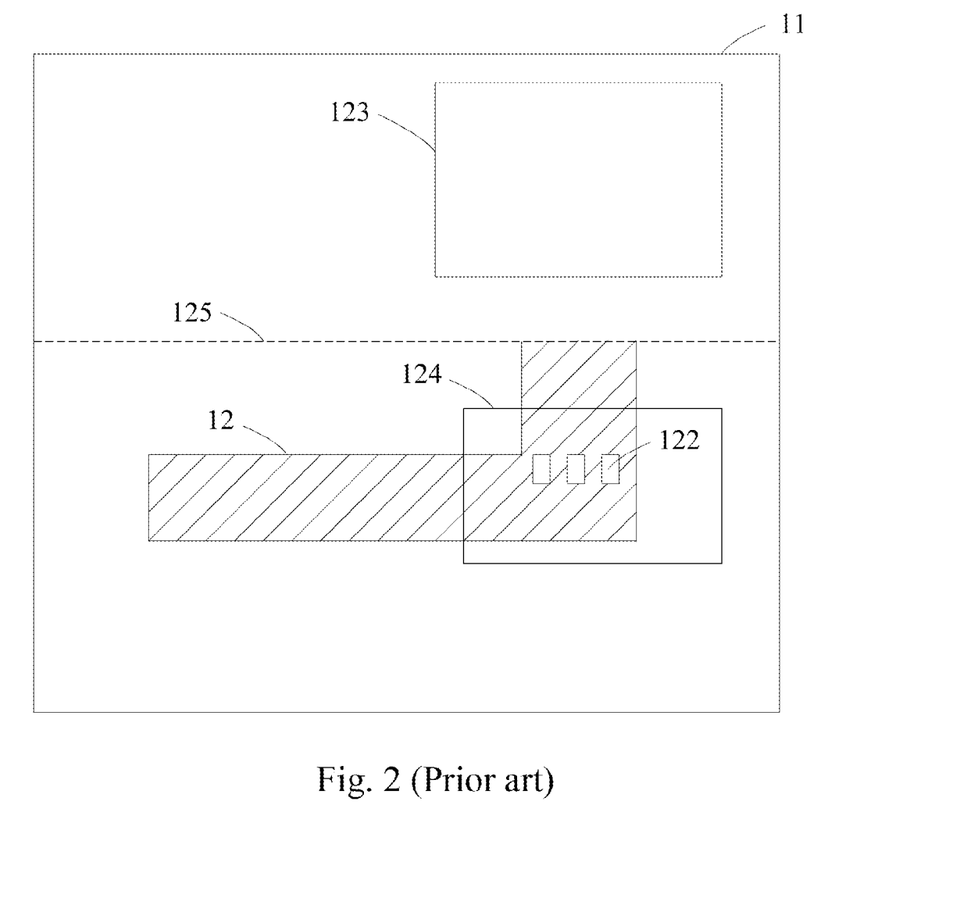
FIG. 2 is a schematic diagram showing a result of a conventional LCD device as shown in FIG. 1 after the process of edge exposure.

Referring to FIG. 2, when the exposed edge 125 is closer to an inner side of the substrate 11, the metallic wiring layer 12, which is outside the exposed edge 125, would be washed out. However, the testing point 13 is disposed outside the exposed edge 125 of the metallic wiring layer 12, so the metallic wiring layer 12 between the testing point 13 and the second via 122 would be washed out. Accordingly, the testing point 13 and the second via 122 are disconnected, causing the testing point 13 to be ineffective.

Therefore, there is a need for an LCD device and a method of manufacturing the same for solving the above-mentioned problem.

SUMMARY OF THE INVENTION

An object of the present invention is to provide an LCD device and a method of manufacturing the same. By means of the connection between a first transparent conducting layer and a second transparent conducting layer, a testing point could be prevented from malfunctioning.

According to the present, a liquid crystal display (LCD) device comprises: a metallic wiring layer, disposed on a substrate, a first via, a second via, and a third via disposed on the metallic wiring layer, the metallic wiring layer comprising a first metallic wiring layer and a second metallic wiring layer, the first metallic wiring layer and the second metallic wiring layer sequentially disposed on the substrate, a first insulating layer disposed between the first metallic wiring layer and the second metallic wiring layer, and a second insulating layer disposed on the second metallic wiring layer; the first via penetrating the second insulating layer, a first transparent conducting layer disposed on the first via for forming a testing point, and the first transparent conducting layer covering the second metallic wiring layer through the first via; the second via penetrating the first insulating layer, the second metallic wiring layer, and the second insulating layer, the third via penetrating the second insulating layer, a second transparent conducting layer disposed on the second via and the third via, and the second transparent conducting layer covering the first metallic wiring layer and the second metallic wiring layer through the second via and the third via; wherein the first transparent conducting layer is connected to the second transparent conducting layer.

According to the present, an LCD device comprises: a metallic wiring layer, disposed on a substrate, a first via, a second via, a third via disposed on the metallic wiring layer, wherein a first transparent conducting layer is disposed on the first via for forming a testing point, a second transparent conducting layer is disposed on the second via and the third via, and the first transparent conducting layer is connected to the second transparent conducting layer.

In one aspect of the present invention, the metallic wiring layer comprises a first metallic wiring layer and a second metallic wiring layer, the first metallic wiring layer and the second metallic wiring layer are sequentially disposed on the substrate, a first insulating layer is disposed between the first metallic wiring layer and the second metallic wiring layer, and a second insulating layer is disposed on the second metallic wiring layer.

In another aspect of the present invention, the first via penetrates the second insulating layer, and the first transparent conducting layer covers the second metallic wiring layer through the first via.

In still another aspect of the present invention, the second via penetrates the first insulating layer, the second metallic wiring layer, and the second insulating layer, the third via penetrates the second insulating layer, and the second transparent conducting layer covers the first metallic wiring layer and the second metallic wiring layer through the second via and the third via.

In yet another aspect of the present invention, the second via and the third via both are disposed within an exposed edge of the metallic wiring layer.

According to the present invention, a method of manufacturing an LCD device comprises: providing a substrate; disposing a metallic wiring layer on the substrate, and disposing a first via, a second via, and a third via on the metallic wiring layer; disposing a first transparent conducting layer on the first via for forming a testing point, and disposing a second transparent conducting layer on the second via and the third via, wherein the first transparent conducting layer is connected to the second transparent conducting layer; performing a process of edge exposure on the metallic wiring layer on the substrate so that the first transparent conducting layer could be still connected to the second transparent conducting layer after the metallic wiring layer undergoes the process of edge exposure.

In one aspect of the present invention, the metallic wiring layer comprises a first metallic wiring layer and a second metallic wiring layer, the first metallic wiring layer and the second metallic wiring layer are sequentially disposed on the substrate, a first insulating layer is disposed between the first metallic wiring layer and the second metallic wiring layer, and a second insulating layer is disposed on the second metallic wiring layer.

In another aspect of the present invention, the first via penetrates the second insulating layer, and the first transparent conducting layer covers the second metallic wiring layer through the first via.

In still another aspect of the present invention, the second via penetrates the first insulating layer, the second metallic wiring layer, and the second insulating layer, the third via penetrates the second insulating layer, and the second transparent conducting layer covers the first metallic wiring layer and the second metallic wiring layer through the second via and the third via.

In yet another aspect of the present invention, the second via and the third via both are disposed within the exposed edge of the metallic wiring layer.

Compared with the prior art, the benefit of the present invention is that, the testing point could be connected to a first metallic wiring layer and a second metallic wiring layer, which ensures that the testing point keeps effective. The LCD device and the method of manufacturing the same in the present invention adopt the connection between the first transparent conducting layer and the second transparent conducting layer. The first transparent conducting layer could still be connected to the second transparent conducting layer after a process of edge exposure.

BRIEF DESCRIPTION OF THE DRAWINGS

For better understanding embodiments of the present invention, the following detailed description taken in conjunction with the accompanying drawings is provided. Apparently, the accompanying drawings are merely for some of the embodiments of the present invention. Any ordinarily skilled person in this art could still obtain other accompanying drawings based on the present accompanying drawings. The detailed description is as follows.

DETAILED DESCRIPTION OF THE PREFERRED EMBODIMENTS

Figure 3:
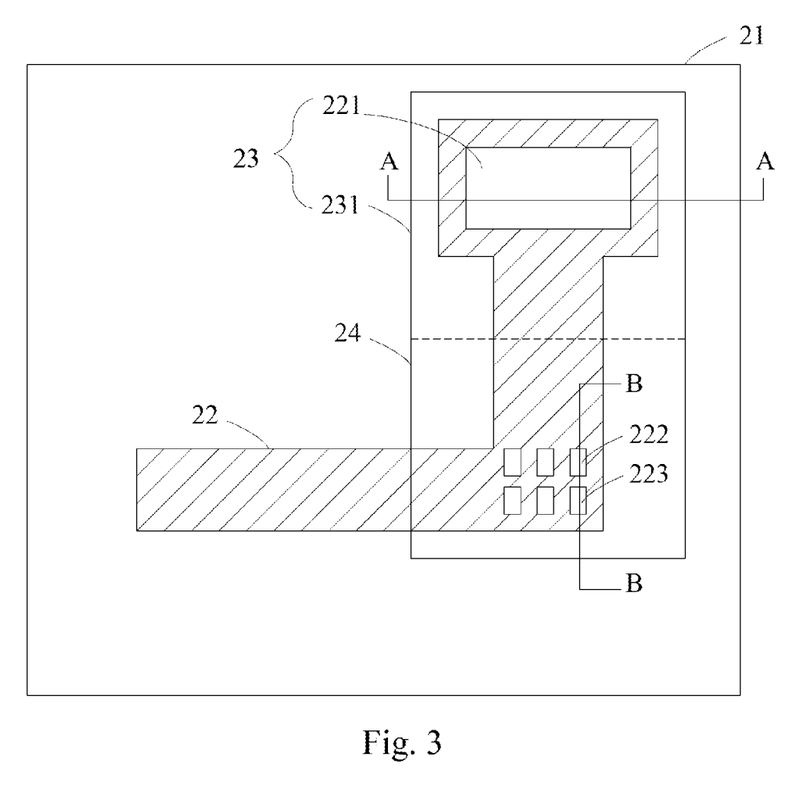
FIG. 3 is a structure diagram showing an LCD device according to a first embodiment of the present invention.

Referring to FIG. 3, FIG. 3 is a structure diagram showing an LCD device according to a first embodiment of the present invention. The LCD device proposed by the present embodiment comprises a substrate 21 and a metallic wiring layer 22 disposed on the substrate 21.

In the present embodiment, a first via 221, a second via 222, and a third via 223 are disposed on the metallic wiring layer 22. The first via 221, the second via 222, and the third via 223 are respectively disposed on the metallic wiring layer 22. A first transparent conducting layer 231 is disposed on the first via 221 for forming a testing point 23. The testing point 23 is used for examining whether the metallic wiring layer 22 is normal or not. Moreover, a second transparent conducting layer 24 is disposed on the second via 222 and the third via 223. The first transparent conducting layer 231 is connected to the second transparent conducting layer 24.

What is worthy of noting is that, a dotted line shown in FIG. 3 represents a boundary line between the first transparent conducting layer 231 and the second transparent conducting layer 24. It should be understood that, there is no specific boundary line between the first transparent conducting layer 231 and the second transparent conducting layer 24 in real structure. The boundary line could be formed by the same transparent conducting layer.

The first transparent conducting layer 231 and the second transparent conducting layer 24 are preferably made of indium tin oxides (ITO), or could be made of indium zinc oxide (IZO) or transparent materials having conductivity.

Figure 4:
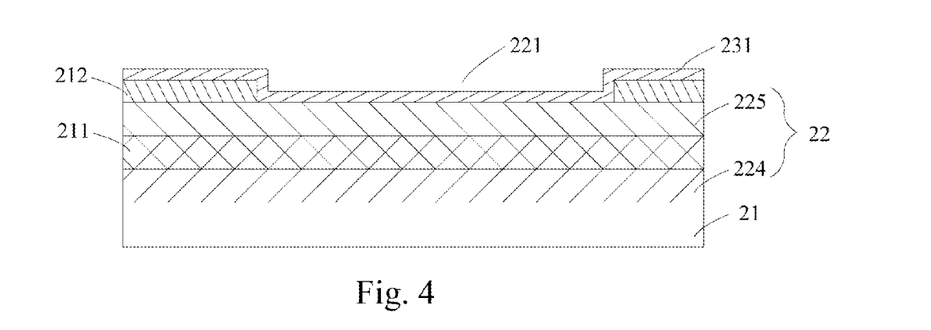
FIG. 4 is a cross-sectional view of the first via of FIG. 3 taken along a section line of A-A.

FIG. 4 is a cross-sectional view of the first via 221 of FIG. 3 taken along a section line of A-A. The metallic wiring layer 22 comprises a first metallic wiring layer 224 and a second metallic wiring layer 225. The first metallic wiring layer 224 and the second metallic wiring layer 225 are sequentially disposed on the substrate 21. A first insulating layer 211 is disposed between the first metallic wiring layer 224 and the second metallic wiring layer 225. A second insulating layer 212 is disposed on the second metallic wiring layer 225.

In the present embodiment, the first via 221 penetrates the second insulating layer 212. The first transparent conducting layer 231 covers the second metallic wiring layer 225 through the first via 221 so that the first transparent conducting layer 231 could be connected to the second metallic wiring layer 225.

Figure 5:
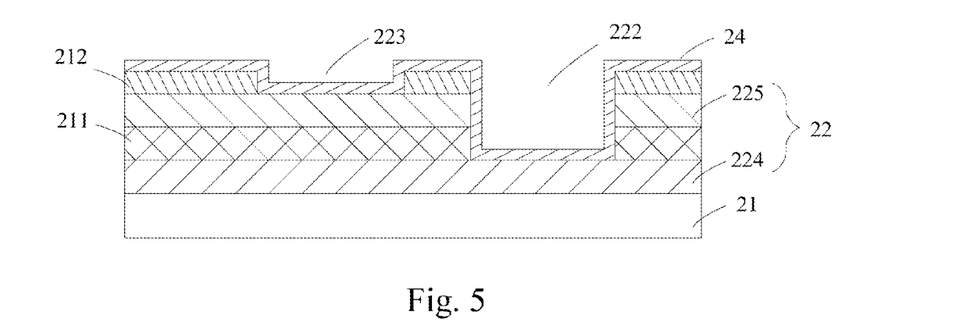
FIG. 5 is a cross-sectional view of the second via and the third via of FIG. 3 taken along a section line of B-B.

FIG. 5 is a cross-sectional view of the second via 222 and the third via 223 of FIG. 3 taken along a section line of B-B. As shown in FIG. 5, the second via 222 penetrates the first insulating layer 211, the second metallic wiring layer 225, and the second insulating layer 212. The third via 223 penetrates the second insulating layer 212. The second transparent conducting layer 24 covers the first metallic wiring layer 224 and the second metallic wiring layer 225 through the second via 222 and the third via 223 so that the first metallic wiring layer 224 could be connected to the second metallic wiring layer 225 through the second transparent conducting layer 24.

Figure 6:
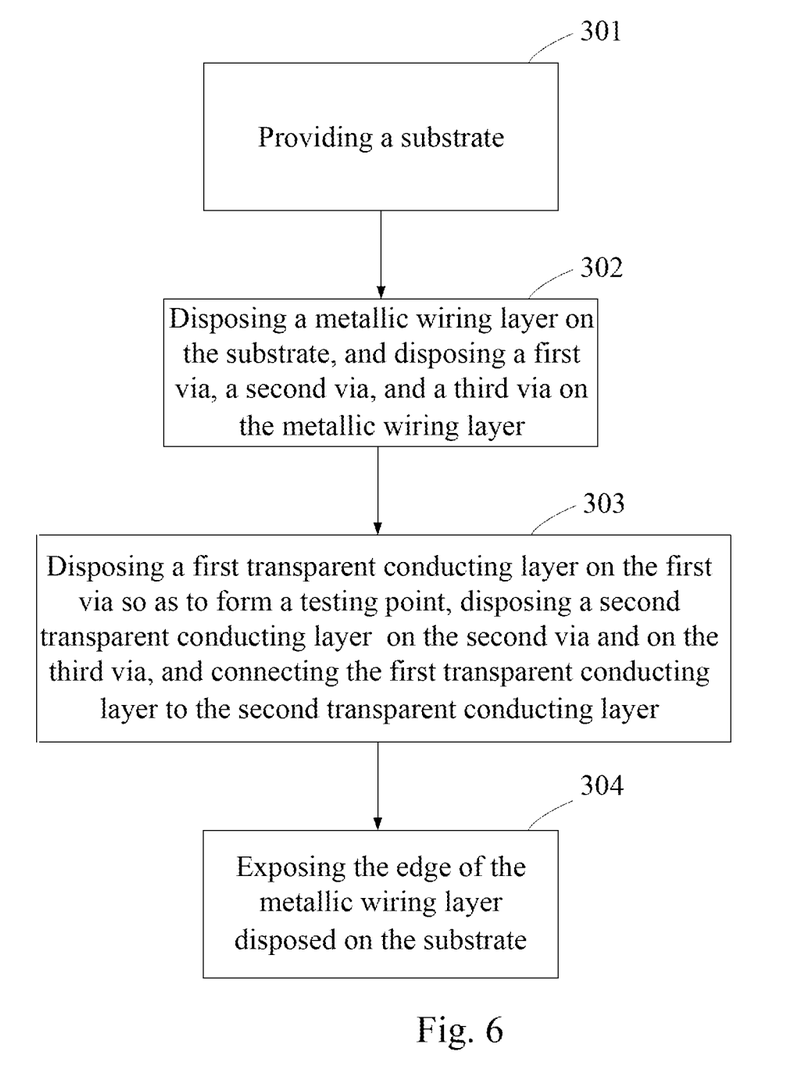
FIG. 6 is a flow chart showing a method of manufacturing the LCD device of the present invention.

Referring to FIG. 6, FIG. 6 is a flow chart showing a method of manufacturing the LCD device of the present invention. The method of manufacturing comprises the following steps of:

Step 301: providing a substrate 21;

Step 302: disposing a metallic wiring layer 22 on the substrate 21, and disposing a first via 221, a second via 222, and a third via 223 on the metallic wiring layer 22;

Step 303: disposing a first transparent conducting layer 231 on the first via 221 so as to form a testing point 23, disposing a second transparent conducting layer 24 on the second via 222 and on the third via 223, and connecting the first transparent conducting layer 231 to the second transparent conducting layer 24;

Step 304: exposing the edge of the metallic wiring layer 22 disposed on the substrate 21.

Figure 7:
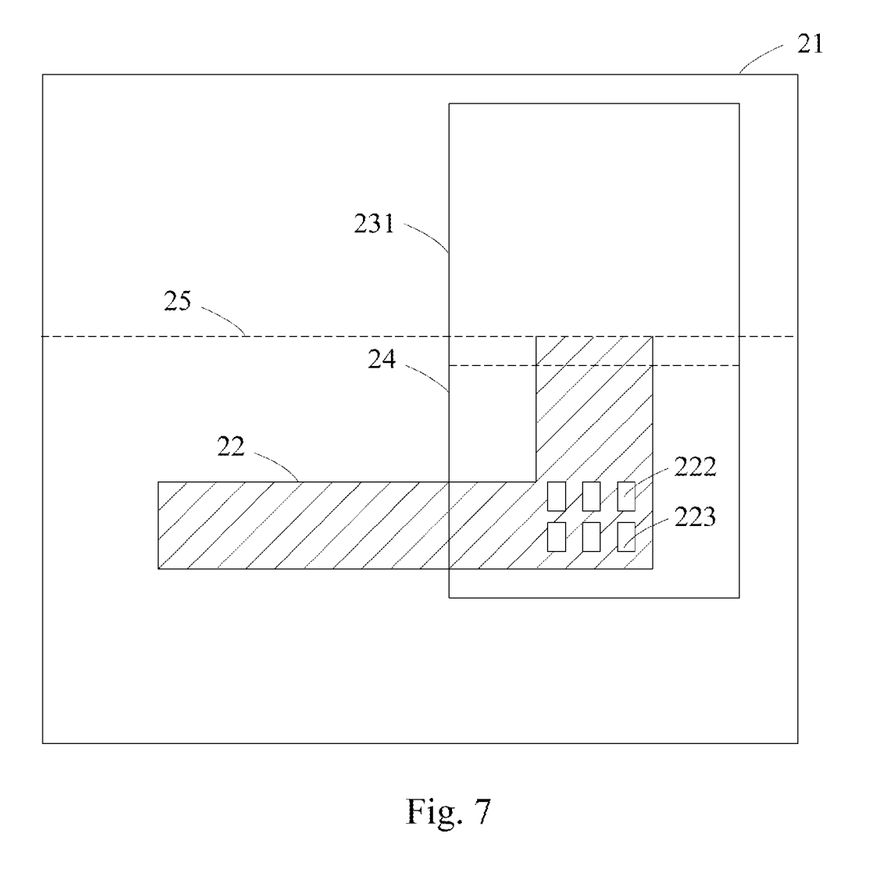
FIG. 7 is a schematic diagram showing an effect of the process of edge exposure according to the method of manufacturing the LCD device of the present invention.

FIG. 7 is a schematic diagram showing an effect of the process of edge exposure according to the method of manufacturing the LCD device of the present invention. In Step 304, the metallic wiring layer 22 situated under the first transparent conducting layer 231 and the second transparent conducting layer 24 undergoes the edge exposure along an exposed edge 25. At this point, the first transparent conducting layer 231 and the second transparent conducting layer 24 disposed on the metallic wiring layer 22 are connected to each other. Although the metallic wiring layer 22 outside the exposed edge 25 is washed out after the edge exposure, resulting in the disconnection of the metallic wiring layer 22, the testing point 23 could still be connected to the second via 222 and the third via 223 disposed on the metallic wiring layer 22 through the first transparent conducting layer 231 and the second transparent conducting layer 24. The testing point 23 is successfully prevented from malfunctioning.

In this embodiment, the distance between the substrate 21 and the exposed edge 25 of the metallic wiring layer 22 is preferably 15 mm. The second via 222 and the third via 223 both are disposed within the exposed edge 25 of the metallic wiring layer 22. That is, the distance between the second via 222 and the substrate 21 is larger than 15 mm, and the distance between the third via 223 and the substrate 21 is larger than 15 mm, too. In this way, the first metallic wiring layer 224 and the second metallic wiring layer 225 covered by the second transparent conducting layer 24 are prevented from being washed out, thereby preventing the testing point 23 from malfunctioning.

Figure 8:
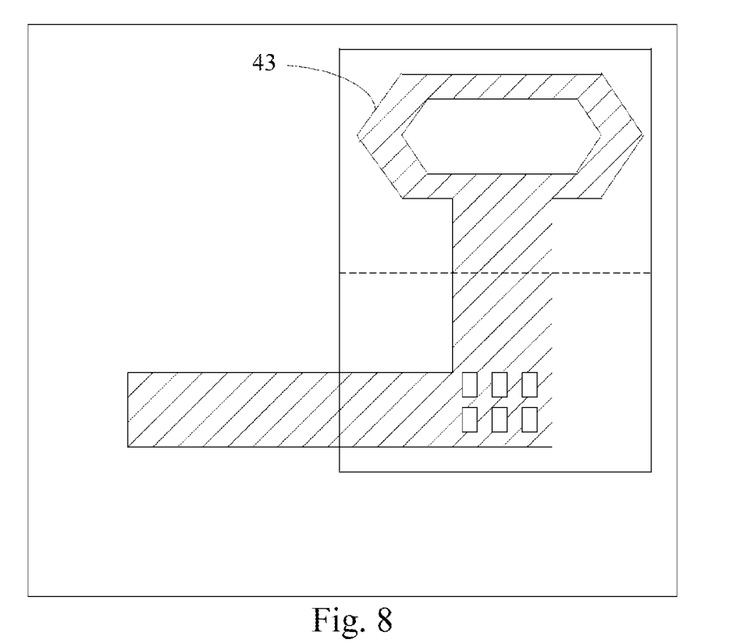
FIG. 8 is a structure diagram showing an LCD device according to a second embodiment of the present invention.

It is noted that the testing point 23 is rectangular in the present embodiment. In other embodiments, a person skilled in the art could alter the shape of the testing point 23. The testing point 23 could be an arbitrary shape such as a hexagon, as shown in FIG. 8.

Figure 9:
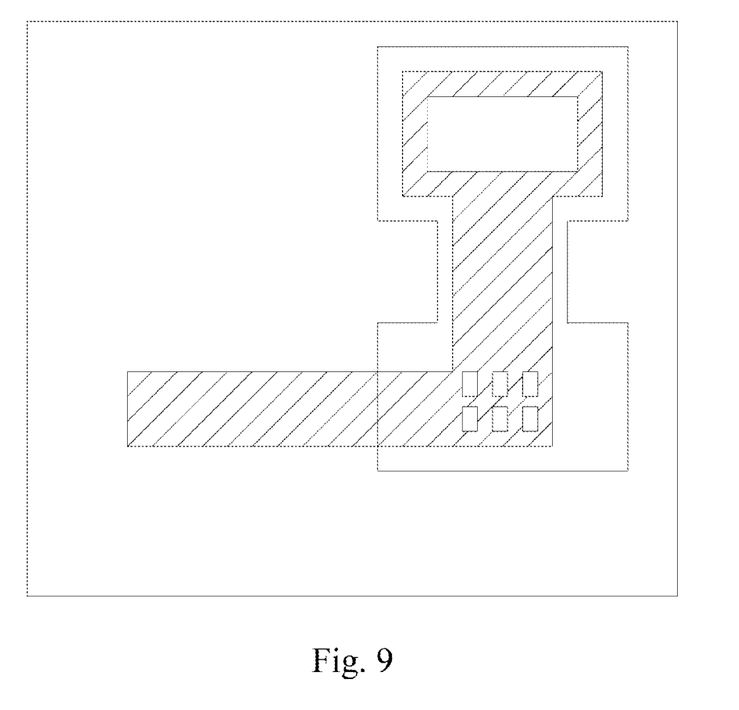
FIG. 9 is a structure diagram showing an LCD device according to a third embodiment of the present invention.

In addition, the first transparent conducting layer 231 and the second transparent conducting layer 24 are arranged in a rectangle in the present embodiment. The person skilled in the art could form the first transparent conducting layer 231 and the second transparent conducting layer 24 into an arbitrary shape such as an I-shape, as shown in FIG. 9 in other embodiments.

In conclusion, the LCD device and the method of manufacturing the same of the present invention adopt the connection between the first transparent conducting layer 231 and the second transparent conducting layer 24. The first transparent conducting layer 231 could still be connected to the second transparent conducting layer 24 after the process of edge exposure. It ensures that the testing point 23 could be connected to the first metallic wiring layer 224 and the second metallic wiring layer 225, preventing the testing point 23 from malfunctioning.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A liquid crystal display (LCD) device, comprising:
a metallic wiring layer, disposed on a substrate, a first via, a second via, and a third via disposed on the metallic wiring layer, the metallic wiring layer comprising a first metallic wiring layer and a second metallic wiring layer, the first metallic wiring layer and the second metallic wiring layer sequentially disposed on the substrate, a first insulating layer disposed between the first metallic wiring layer and the second metallic wiring layer, and a second insulating layer disposed on the second metallic wiring layer;
the first via penetrating the second insulating layer, a first transparent conducting layer disposed on the first via for forming a testing point, and the first transparent conducting layer covering the second metallic wiring layer through the first via;
the second via penetrating the first insulating layer, the second metallic wiring layer, and the second insulating layer, the third via penetrating the second insulating layer, a second transparent conducting layer disposed on the second via and the third via, and the second transparent conducting layer covering the first metallic wiring layer and the second metallic wiring layer through the second via and the third via;
wherein the first transparent conducting layer is connected to the second transparent conducting layer,
wherein the second transparent conducting layer contacts the first metallic wiring layer and the second metallic wiring layer in the second via.

2. An LCD device comprising:
a metallic wiring layer, disposed on a substrate, a first via, a second via, a third via disposed on the metallic wiring layer, wherein a first transparent conducting layer is disposed on the first via for forming a testing point, a second transparent conducting layer is disposed on the second via and the third via, and the first transparent conducting layer is connected to the second transparent conducting layer,
wherein the metallic wiring layer comprises a first metallic wiring layer and a second metallic wiring layer, the first metallic wiring layer and the second metallic wiring layer are sequentially disposed on the substrate, a first insulating layer is disposed between the first metallic wiring layer and the second metallic wiring layer, and a second insulating layer is disposed on the second metallic wiring layer,
wherein the second via penetrates the first insulating layer, the second metallic wiring layer, and the second insulating layer, the third via penetrates the second insulating layer, and the second transparent conducting layer covers the first metallic wiring layer and the second metallic wiring layer through the second via and the third via, and
wherein the second transparent conducting layer contacts the first metallic wiring layer and the second metallic wiring layer in the second via.

3. The LCD device as claimed in claim 2, wherein the first via penetrates the second insulating layer, and the first transparent conducting layer covers the second metallic wiring layer through the first via.

4. The LCD device as claimed in claim 2, wherein the second via and the third via both are disposed within an exposed edge of the metallic wiring layer.

5. A method of manufacturing an LCD device, comprising:
providing a substrate;
disposing a metallic wiring layer on the substrate, and disposing a first via, a second via, and a third via on the metallic wiring layer;
disposing a first transparent conducting layer on the first via for forming a testing point, and disposing a second transparent conducting layer on the second via and the third via, wherein the first transparent conducting layer is connected to the second transparent conducting layer;
performing a process of edge exposure on the metallic wiring layer on the substrate so that the first transparent conducting layer could be still connected to the second transparent conducting layer after the metallic wiring layer undergoes the process of edge exposure,
wherein the metallic wiring layer comprises a first metallic wiring layer and a second metallic wiring layer, the first metallic wiring layer and the second metallic wiring layer are sequentially disposed on the substrate, a first insulating layer is disposed between the first metallic wiring layer and the second metallic wiring layer, and a second insulating layer is disposed on the second metallic wiring layer,
wherein the second via penetrates the first insulating layer, the second metallic wiring layer, and the second insulating layer, the third via penetrates the second insulating layer, and the second transparent conducting layer covers the first metallic wiring layer and the second metallic wiring layer through the second via and the third via, and wherein the second transparent conducting layer contacts the first metallic wiring layer and the second metallic wiring layer in the second via.

6. The method of manufacturing an LCD device as claimed in claim 5, wherein the first via penetrates the second insulating layer, and the first transparent conducting layer covers the second metallic wiring layer through the first via.

7. The method of manufacturing an LCD device as claimed in claim 5, wherein the second via and the third via both are disposed within the exposed edge of the metallic wiring layer.

* * * * *